Figure 1:
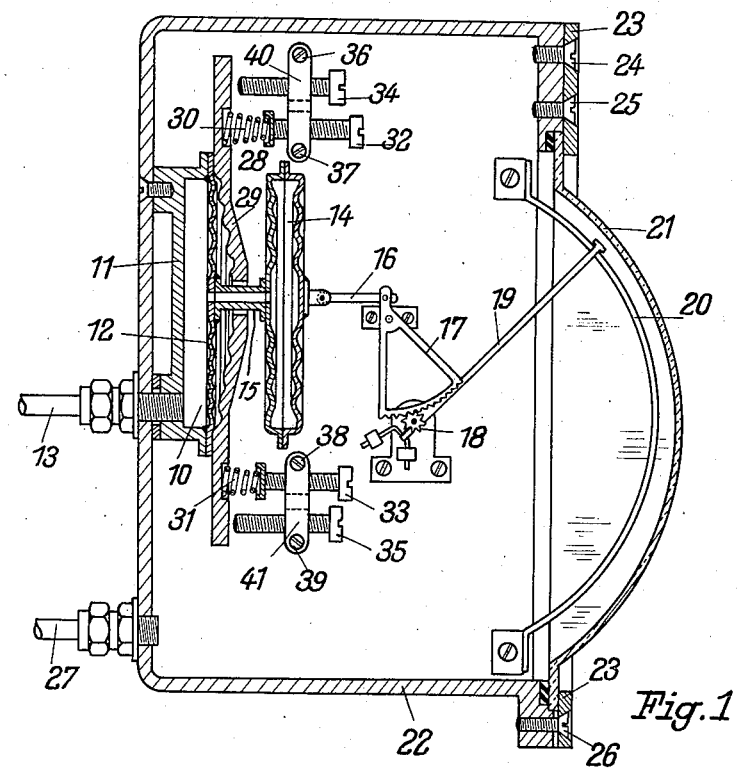

Jan. 2, 1940.   G. ACHTEL ET AL   2,185,971
FLUID PRESSURE RESPONSIVE INSTRUMENT
Filed June 11, 1937

JOINT INVENTORS:
Georg Achtel
Karl Schilling
Kurt Mink

UNITED STATES PATENT OFFICE 2,185,971

FLUID PRESSURE RESPONSIVE INSTRUMENT

Georg Achtel, Karl Schilling, and Kurt Misch, Berlin, Germany, assignors to Askania-Werke A. G., a corporation of Germany Application June 11, 1937, Serial No. 147,798
In Germany June 15, 1936

13 Claims. (Cl. 73—110)

This invention relates to pressure responsive instruments for indicating or recording fluid pressures. More particularly this invention relates to such instruments as are designed to cover a wide measuring range. Instruments of this kind are for example air speed indicators used on aircraft for determining the velocity of the craft.

While the usual pressure responsive instruments, such as altimeters, or pressure gages, have a relatively narrow range of measurement which may adequately be covered with a single pressure responsive member, such as a diaphragm capsule, giving indications with sufficient accuracy, the problem of covering a wide pressure range becomes a difficult one. The use of a single pressure responsive member covering the whole range would result in an instrument not sensitive enough in the lower range.

It is therefore an object of this invention to provide an instrument having a plurality of pressure responsive members of different sensitivity together with means protecting the more sensitive members against overload at higher pressures.

It is a further object of this invention to provide protecting means which are also adapted to modify the movements of the pressure responsive members with the object, for example, of straightening parabolic pressure vs. movement, or velocity vs. movement characteristics into a linear relation.

Further aims, objects and advantages of this invention will appear from a consideration of the description which follows with the accompanying drawing showing an embodiment of this invention for illustrative purposes. It is to be understood, however, that the description is not to be taken in a limiting sense, the scope of the invention being defined in the appended claims.

Referring to the drawing:

In Fig. 1 a differential pressure responsive instrument adapted for use as airspeed indicator is shown in sectional elevation.

Figure 2:
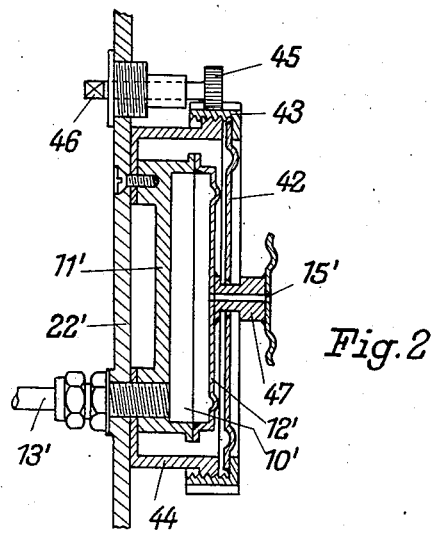

In Fig. 2 a modified form is shown in sectional elevation.

A pressure responsive member shown in the form of a diaphragm capsule 10 having a rigid wall 11 and a flexible wall 12 is exposed to pressure impulses transmitted through a conduit 13. A second pressure responsive diaphragm capsule 14 is mounted on and in communication with the first capsule by means of a hollow stem 15. It is therefore apparent that the movements of both capsules will be superposed on each other. The second capsule is connected by means of a link 16 to a toothed segment 17 meshing with a pinion 18 for operating a suitable indicator or recorder shown in the example in the form of a pointer 19 and scale 20.

Pointer and scale are visible through a curved window 21 tightly held against an outer instrument casing 22 by means of a frame 23, and screws 24, 25 and 26. The interior of the casing communicates with a further conduit 27.

The pressure responsive capsules are thus exposed to the differential pressure existing in the lines 13 and 27. In the instance of an air speed meter the conduit 13 will be connected to the dynamic pressure of the moving air, while the conduit 27 will be connected to the static pressure, as is well known in the art.

The pressure responsive members, capsules 10 and 14 are of different sensitivity. For instance, it may be assumed that the member 10 covers a lower pressure range, while the member 14 is provided for covering the upper range. It is easily understood that a high pressure is liable to overstrain the sensitive member 12. Means are therefore provided to protect the sensitive member against overload. A rigid disk 28 having recesses 29 in order to receive the corrugations of the diaphragm wall 12 is positioned opposite to the same. Upon rising pressures the wall 12 will expand and rest itself against the disk 28 which now bears the load and prevents breaking of the delicate diaphragm. As shown in the drawing the recesses of the disk may be conically arranged in order to receive annular portions of the diaphragm successively.

The stop member, disk 28, may be resiliently mounted within the instrument casing. For this purpose conical springs 30, 31 are shown, bearing against the disk and adjusting screws 32, 33 respectively. Further screws 34, 35 may be provided for arresting the movement of the disk after a predetermined movement. The adjusting screws may be firmly held in the adjusted position by any suitable means such as clamping screws 36, 37 and 38, 39 for clamping the upper part of the blocks 40, 41 down on the lower part. The blocks are for this purpose slotted in a plane parallel to the paper.

The operation of the illustrated device is as follows:

To pressure impulses of a low magnitude the diaphragm 14 will not respond and act as a rigid connection between the link 16 and the diaphragm 12. Upon a rise of pressure the diaphragm 12 will gradually come into contact with the disk 28 and the springs 30, 31 counteract a further movement which, however, can still take place until the disk 28 is arrested by the screws 34, 35. The springs 30, 31 are shown as having conical coils which upon compression gradually rest upon each other, thereby gradually increasing the stiffness of the spring, as is well known in the art. The counteracting force of the springs may therefore be matched to the diaphragm forces in order to eliminate the parabolic wind velocity vs. dynamic pressure relation. The pointer 19 may thereby be made to travel substantially linearly to the wind velocity.

Upon reaching high pressure magnitudes only the diaphragm capsule 14 will respond and move the pointer.

Instead of making the stop member rigid and its mounting resilient it is also possible to employ a resilient stop member on a rigid mounting. A modified and preferred form of the invention is shown in Fig. 2.

A diaphragm capsule 10' having rigid and flexible walls 11' and 12', respectively, is in communication with a pressure conduit 13'.

Spaced from the flexible wall 12' a diaphragm 42 is arranged the rim of which is secured to an inwardly threaded ring 43. The threaded ring is adjustable relatively to an outwardly threaded casing 44 secured to the instrument casing 22'. For conveniently adjusting the diaphragm 42 with the ring 43 relatively to the capsule 10' a pinion 45 may be provided meshing with teeth at the circumference of the ring 43 and having a shaft 46 projecting from the instrument casing. A stem 15' either directly actuating the indicating mechanism or carrying a further capsule is conveniently provided with a flange 47, engaging the diaphragm 42 upon a contraction of the capsule 10'.

Upon expansion and contraction of the capsule 10' the diaphragm 42 will counteract and thereby modify the movements of the capsule 10' in the above described manner.

Obviously the present invention is not limited to the embodiment herein shown and described. Moreover, it is not indispensable that all the features of this invention be used conjointly, since they may be employed advantageously in various combinations and subcombinations.

What is claimed is:

1. Pressure responsive instrument comprising, in combination, a first pressure responsive capsule connected to be acted upon by a pressure impulse; a second pressure responsive capsule connected to be moved by, and to communicate with, the first capsule; a stop member associated with one of said pressure responsive capsules to limit the movement thereof and at least partly relieve it from the force created by the pressure impulse; and indicator means connected to be actuated by said second pressure responsive capsule.

2. Pressure responsive instrument comprising, in combination, a first diaphragm capsule connected to be acted upon by a pressure impulse; a second diaphragm capsule connected to be moved by, and to communicate with, said first diaphragm capsule; a resilient stop member associated with one of said diaphragm capsules to counteract the movements thereof and at least partly relieve it from the force created by the pressure impulse; and indicator means connected to be actuated by said pressure responsive capsules.

3. Pressure responsive instrument comprising, in combination, a first diaphragm capsule having a rigid and a movable wall and connected to be acted upon by a pressure impulse; a second diaphragm capsule connected to be moved by and to communicate with, said first capsule; a stop member associated with the first capsule and adapted to bear against the movable wall thereof for limiting its movement and at least partly relieve it from the force created by the pressure impulse; and indicator means connected to be actuated by said capsules.

4. Differential pressure responsive instrument comprising, in combination, a first diaphragm vessel connected to be acted upon by a pressure impulse at the inside; a second diaphragm vessel connected to be moved by, and to communicate with, said first vessel; a pressure proof instrument casing enclosing said vessels; a stop member associated with one of said vessels to limit the movement of the diaphragm forming a wall of this vessel and at least partly relieve it from the force created by the pressures inside the vessel and the casing; and indicator means connected to be actuated by said vessels.

5. Differential pressure responsive instrument comprising, in combination, a first diaphragm capsule having a rigid and a movable wall and connected to be acted upon at the inside by a pressure impulse; a second diaphragm capsule connected to be moved by, and to communicate with, said first capsule; a pressure proof instrument casing enclosing said vessels; a stop member associated with the first capsule and adapted to bear against the movable wall thereof for limiting its movement and at least partly relieve it from the force created by the pressures inside the capsule and the casing; and indicator means connected to be actuated by said vessels.

6. Differential pressure responsive instrument comprising, in combination, a first diaphragm capsule having a rigid and a movable wall and connected to be acted upon at the inside by a pressure impulse; a second diaphragm capsule connected to be moved by, and to communicate with, said first capsule; a pressure proof instrument casing enclosing said capsules; a disk arranged opposite the movable wall of said first capsule and adapted to bear against the wall upon movement thereof; springs to support said disk; and indicator means connected to be actuated by said capsules for indicating the pressure differential between the interior of said casing and said capsules.

7. In a pressure responsive instrument two diaphragm capsules having different ranges of measurement and arranged in line so as to superpose their movements; and a rigid member lying concentrically to the capsules and arranged to bear against the movable wall of the capsule having the lower pressure range after a predetermined movement of the same, thereby relieving the capsule of at least part of the pressure force acting on the same and modifying its movement.

8. In a pressure responsive instrument two diaphragm capsules having different ranges of measurement and arranged in line so as to superpose their movements; a rigid member lying concentrically to the capsules and arranged to bear against the movable wall of the capsule having the lower pressure range after a predetermined movement of the same, thereby relieving the capsule of at least part of the pressure force acting on the same and modifying its movement; and means for resiliently supporting said member.

9. In a pressure responsive instrument a diaphragm capsule connected to be acted upon by a pressure impulse to expand and contract in response thereto; a diaphragm spaced from said capsule and arranged to counteract the movements of the diaphragm of said capsule, and means for adjusting the space between the two diaphragms, whereby the movements of the capsule are modified by the resilient action of said diaphragm.

10. Pressure responsive instrument comprising, in combination, a diaphragm capsule connected to be acted upon by a pressure impulse to expand and contract in response thereto; a diaphragm spaced from said capsule and arranged to counteract the movements of the same; means for adjusting the space of said diaphragm relatively to said capsule; and indicator means connected to be actuated by said capsule, the movements of which are modified by the resilient action of said diaphragm.

11. Differential pressure responsive instrument comprising, in combination, a diaphragm capsule connected to be acted upon by a pressure impulse to expand and contract in response thereto; a diaphragm spaced from said capsule and arranged to counteract the movements of the diaphragm of the capsule; a pressure proof instrument casing enclosing said diaphragm capsule; and indicator means connected to be actuated by said capsule for indicating the movements of said capsule which thus become a combined function of the differential pressure inside the capsule and the casing and the resilient action of said diaphragm.

12. Differential pressure responsive instrument comprising, in combination, a diaphragm capsule connected to be acted upon by a pressure impulse to expand and contract in response thereto; a diaphragm spaced from said capsule and arranged to counteract the movements of the diaphragm of the capsule; means for adjusting the space between the two diaphragms; and a pressure proof instrument casing enclosing said diaphragm capsule for indicating the movements of said capsule which thus become a combined function of the differential pressure inside the capsule and the casing and the resilient action of said diaphragm.

13. In a pressure responsive instrument a first diaphragm forming a wall of a pressure chamber; a screw threaded ring bearing a second diaphragm substantially parallel to said first diaphragm adjustable thereto by turning said ring to modify the movement of said first diaphragm, the two diaphragms being adapted to engage at a predetermined pressure.

GEORG ACHTEL.
KARL SCHILLING.
KURT MISCH.